US 6,736,171 B2

(12) United States Patent  
Harris

(10) Patent No.: US 6,736,171 B2
(45) Date of Patent: May 18, 2004

(54) ASSEMBLY FOR DELIVERING SOLID PARTICULATE MATTER FOR LOADING

(76) Inventor: Jack Harris, 6638 Pecue La., Baton Rouge, LA (US) 70817

( * ) Notice: Subject to any disclaimer, the term of this patent is extended or adjusted under 35 U.S.C. 154(b) by 0 days.

(21) Appl. No.: 10/152,765

(22) Filed: May 21, 2002

(65) Prior Publication Data

US 2003/0217783 A1 Nov. 27, 2003

(51) Int. Cl.[7] ................................................. B65B 1/08
(52) U.S. Cl. ............................ 141/67; 141/68; 141/286
(58) Field of Search ............................... 141/67, 68, 59, 141/65, 286; 406/168, 152, 191, 192, 194, 195; 239/311

(56) References Cited

U.S. PATENT DOCUMENTS

| 213,709 | A | * | 3/1879 | Taggart | 406/168 |
|---|---|---|---|---|---|
| 268,303 | A | * | 11/1882 | Smith | 406/168 |
| 2,142,990 | A | * | 1/1939 | Belcher | 141/286 |
| 2,332,281 | A | * | 10/1943 | Van Der Pyl | 451/102 |
| 3,223,456 | A | | 12/1965 | Sonnenschein | |
| 3,788,368 | A | * | 1/1974 | Geng et al. | 141/67 |
| 4,182,386 | A | * | 1/1980 | Alack | 141/83 |
| 4,381,897 | A | | 5/1983 | Arbeletche et al. | |
| 4,457,125 | A | * | 7/1984 | Fishburne | 141/80 |
| 4,703,782 | A | * | 11/1987 | Henkel, Sr. | 141/286 |
| 4,872,493 | A | * | 10/1989 | Everman | 141/67 |
| 4,900,200 | A | * | 2/1990 | Harumoto et al. | 406/152 |
| 5,316,056 | A | * | 5/1994 | Stott | 141/68 |
| 5,501,254 | A | * | 3/1996 | Bjorklund | 141/65 |
| 5,503,198 | A | * | 4/1996 | Becker | 141/67 |
| 5,518,048 | A | * | 5/1996 | Derby | 141/67 |
| 5,531,252 | A | * | 7/1996 | Derby et al. | 141/67 |
| 6,251,152 | B1 | * | 6/2001 | Thiele | 406/168 |
| 6,318,418 | B1 | * | 11/2001 | Grossmann et al. | 141/59 |
| 6,413,020 | B1 | * | 7/2002 | Davison | 406/168 |
| 6,419,425 | B1 | | 7/2002 | Fourcroy et al. | |

FOREIGN PATENT DOCUMENTS

| BE | 545283 | 3/1956 |
|---|---|---|
| DE | 195 29 475 | 2/1997 |
| LU | 35389 | 2/1958 |

* cited by examiner

Primary Examiner—Gene Mancene
Assistant Examiner—Khoa D. Huynh
(74) Attorney, Agent, or Firm—Keaty Professional Law Corporation

(57) ABSTRACT

An assembly for transferring solid particulate matter has a pressurized vessel for retaining a pre-determined quantity of the solid material. A discharge conduit connected to the vessel carries the solid material to a loading vessel, be it a processing tank, a storage vessel, or any other similar container. A discharge nozzle carried by a distant end of the discharge conduit is also connected to a dust collection container. Vacuum created in the dust collection container facilitates entrapment of dust particles generated during transfer of the solid material through the discharge container and carrying of the dust particles away from the discharge opening of the discharge nozzle into the dust collection container.

20 Claims, 1 Drawing Sheet

ASSEMBLY FOR DELIVERING SOLID PARTICULATE MATTER FOR LOADING

BACKGROUND OF THE INVENTION

This invention relates to an assembly for transferring solid particulate matter with the assistance of pressurized airflow into a loading container, which may be a storage container, a processing tank, or other similar vessel. Even more particularly, the present invention relates to an assembly for transferring solid pelletized material into a loading container, wherein the pelletized material generates dust during the transfer process.

Many industries require transport, or delivery of solid particles from storage area or delivery container into another storage container or a processing tank. One of such industries is a chemical industry where pre-determined quantities of solid pellets are loaded into a processing vessel or converter. For instance, sulfuric acid manufacturing plants use a vanadium catalyst, which is supplied in a pelletized form in bags or drums. The catalyst pebbles then need to be loaded into the converter or container where a chemical reaction for generation of gases takes place.

Conventionally, acid processing tanks are upright vessels with a closed top. A plurality of levels or beds of catalyst is contained in each converter. The loading takes place through the top of the converter in the first bed of catalyst and through opening in the side wall of the converter in lower beds. During the loading operation, the catalyst pellets, being delivered by gravity, generate a significant amount of dust. The personnel who perform the loading operation, by necessity have to wear face masks, respirators, and similar protective gear to avoid breathing in the dust that heavily penetrates the area where the loading takes place.

Similar conditions exist in loading operations of other solid particles, for instance, during grain loading into silos and other storage facilities. The loading space has to be equipped with adequate ventilation to minimize the dust particles retention in the loading area and creation of health hazards in such areas.

It would be beneficial, therefore, to provide a loading assembly that prevents dust from escaping the loading conduits or hoppers and creating hazardous conditions in the loading area.

SUMMARY OF THE INVENTION

It is, therefore, an object of the present invention to provide a loading assembly for transferring solid pelletized items from a storage facility to a loading container, while avoiding spreading of dust in the loading area.

It is another object of the present invention to provide a loading assembly for moving solid pelletized items with the help of air pressure from a storage container to a processing tank.

It is a further object of the present invention to provide an assembly for loading pellets of sulfuric acid catalyst, while removing dust generated by the friction of pellets before the dust escapes the loading and transfer conduits.

It is still a further object of the present invention to provide a discharge nozzle that allows diverting the dust particles away from a discharge opening thus preventing escape of the dust particles into the atmosphere.

These and other objects of the present invention are achieved through a provision of an assembly adapted for transferring solid particulate matter, such as pellets, to a loading vessel. The assembly has an upright vessel that retains a pre-determined quantity of the pellets. The vessel is pressurized, and a discharge conduit is connected to the bottom of the vessel to assist in moving the pellets from the vessel to a loading container, be it a processing tank or a storage container.

The discharge conduit carries a specially designed discharge nozzle, which is also connected to a dust removal conduit. The discharge nozzle has an outer sleeve and an inner pipe extending through the sleeve. The inner pipe is connected to the discharge conduit and is provided with a discharge opening. The outer sleeve has a plurality of air intake openings formed in the wall of the sleeve. The air intake openings are formed downstream from the portion of the sleeve where the dust collection conduit is connected. The inner pipe has a plurality of mesh openings allowing the dust generated during movement of the solid particulate matter to exit the inner pipe and move into an annular space formed between the inner pipe and the outer sleeve.

The dust removal conduit is adapted for connection to a vacuum source, so that the dust particles traveling through the annular space become entrapped in the air stream and are carried away from the discharge nozzle to a dust collection container.

BRIEF DESCRIPTION OF THE DRAWINGS

Reference will now be made to the drawings, wherein like parts are designated by like numerals and wherein.

DETAILED DESCRIPTION OF THE PREFERRED EMBODIMENT

Figure 2:
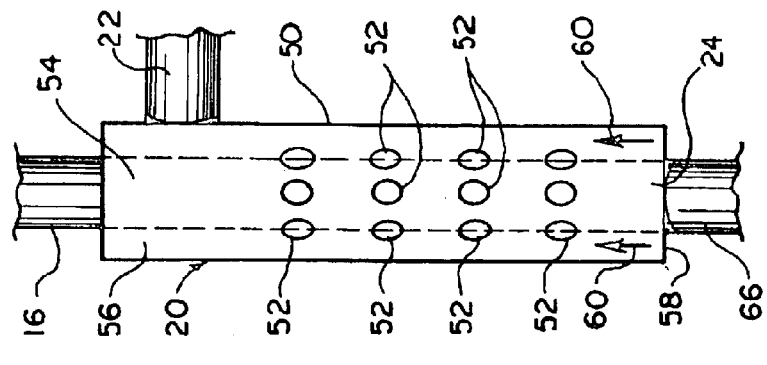
FIG. 2 is a side view of a discharge nozzle for use in the loading assembly of the present invention.
Figure 1:
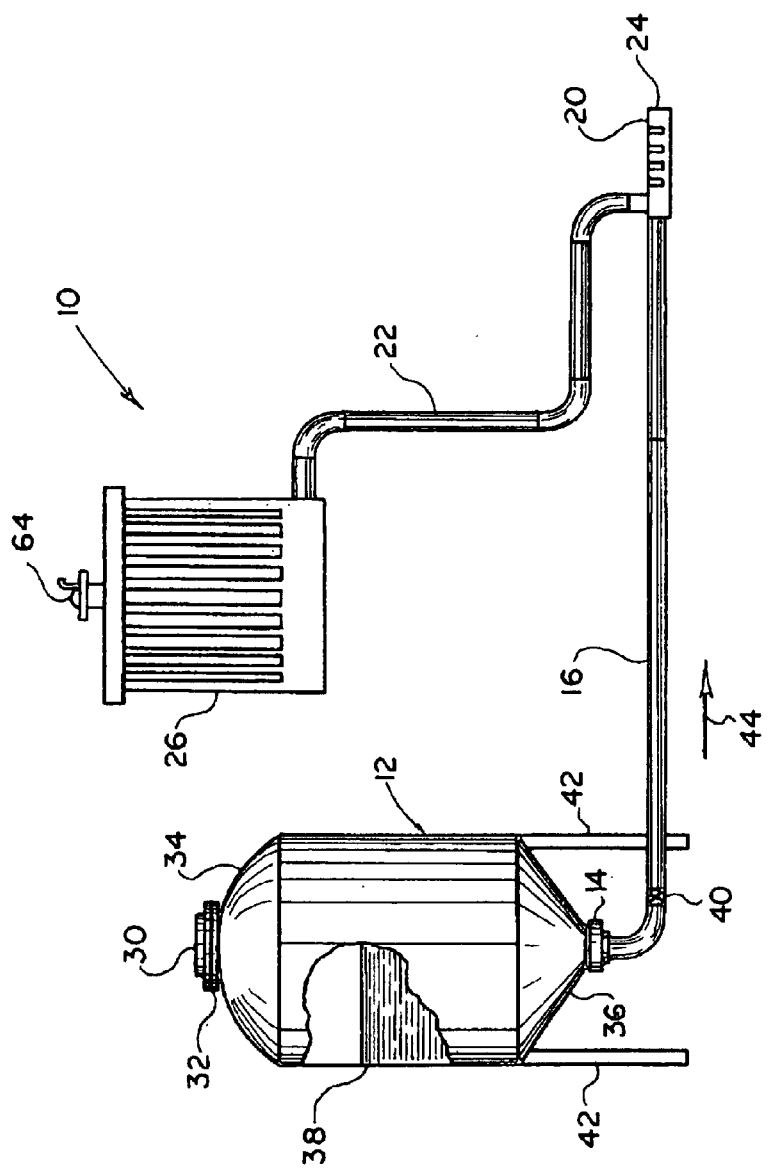
FIG. 1 is a schematic view of the loading assembly in accordance with the present invention.

Turning now to the drawings in more detail, the assembly of the present invention is designated by numeral 10 in FIG. 1. As can be seen in the drawing, the assembly 10 comprises a pressurized container 12 having a bottom discharge 14 in fluid communication with a discharge conduit 16. The discharge conduit 16 is provided with a discharge nozzle 20 at the distant end thereof. A dust removal conduit 22 is in fluid communication with the discharge nozzle 20. The dust conduit 22 is connected to the discharge nozzle 20 upstream from a discharge opening 24 of the discharge nozzle 20. The dust removal conduit 22 is connected to a dust collection container, or vessel 26 and is in fluid communication therewith.

The pressurized container 12 is provided with a top lid 30 that allows loading of the container 12 from the top. The items to be transferred, for instance pellets 38 of the catalyst, are loaded by gravity into the upright container 12. A conduit 32 fluidly connects the lid 30 with a source of air pressure (not shown). A regulating valve (not shown) is mounted in the conduit 32 for regulating the air pressure within the container 12. The container 12 is vertically oriented to facilitate movement of the solid particulate matter loaded into the container 12 from the top 34 to the bottom 36 thereof.

The bottom 36 of the container 12, if desired, can be formed as an inverted cone to facilitate movement of the pelletized solid particles in the interior of the container 12 toward to apex of the cone, which serves as a discharge outlet of the container 12. As can be seen in FIG. 1, the solid particles occupy the lower portion of the container 12 with the top portion 34 being filled with pressurized air to push the pellets downwardly and into the discharge 14 and then into the conduit 16. A shut off valve 40 is positioned in the conduit 16 to regulate movement of solid particles from the container 12 downstream into the conduit 16.

The container 12 is schematically shown as resting on a plurality of supporting legs 42 to allow the bottom 36 of the container 12 to be elevated above the conduit 16. The height of the supporting legs 42 differs depending on the types of container design used.

The solid pellets 38 move through the bottom discharge 14 into the conduit 16 in the direction away from the container 12, as schematically shown by an arrow 44. The air pressure in the conduit 16 is maintained at a sufficient level to allow movement of the pellets 38 through the conduit 16 towards the discharge nozzle 20.

While the pressure in the conduit 16 and the vessel 12 will necessarily differ depending on the material being transferred by the assembly 10, one of the embodiments of the present invention for transferring sulfuric acid catalysts provides for pressurizing of the vessel 5 to 20 p.s.i. The discharge 14 on the bottom of the container 12 opens once the pre-determined pressure is reached. In that particular embodiment, a compressor generating 185 cubic feet per minute (cfm) is used.

As the pelletized items 38 move through the vessel 12 into the conduit 16, they necessarily strike against each other; the friction causes small particles to be chipped off from the pellets 38, generating dust that also travels through the container 12 and the conduit 16. The tiny solid particles then travel along the conduit 16 and reach the discharge nozzle 20. Often times, the size of the loading pipe is approximately equal to the size of the nozzle. In such cases, the dust escapes into the environment. To entrap the dust, the present invention provides for the use of a special discharge nozzle that entraps substantially all dust before it exits the discharge opening 24.

The discharge nozzle 20 comprises a perforated outer sleeve 50 provided with a plurality of air intake openings 52. The openings 52 communicate with the surrounding atmosphere and allow the air to enter the interior of the hollow sleeve 50. Extending through the perforated sleeve 50 is a mesh pipe 54 through which the pelletized material travels from the conduit 16 to the discharge opening 24. The dust removal conduit 22 is connected to the sleeve 50 upstream from the air intake openings 52. The dust is allowed to move from the interior of the inner pipe 54 to an annular space 56 formed between the exterior of the pipe 54 and the interior of the sleeve 50.

Airflow is allowed through the bottom 58 of the sleeve 50 into the annular space 56. The airflow moves upwardly in the direction of arrows 60 from the bottom 58 of the nozzle 20 toward the dust removal conduit 22, as well as through the openings 52 into the annular space 56. The pressure differential between the interior of the pipe 54 and the annular space 56 facilitates movement of the light dust particles by the airflow.

To further assist in moving the dust particles away from the discharge opening 24, the conduit 22 is connected to a dust collection vessel 26, with the interior of the vessel 26 being connected to a vacuum source 64. The vacuum source generates additional pressure differential across the conduit 22 and across the annular space 56. The vacuum facilitates moving of the dust particles from the interior of the pipe 54 into the annular space 56 and eventually, through the conduit 22 into the dust collector vessel 26.

Substantially all dust particles, or a significant amount thereof is diverted from reaching the discharge opening 24 and escaping into the atmosphere. During a catalyst loading operation, the discharge nozzle is placed in the converter and the catalyst is distributed as required. If any of the heavier particles of dust move closer to the bottom 58 of the sleeve 50, the airflow, assisted by the pulling force of the vacuum in the conduit 22, entraps the dust particles in the immediately adjacent area and carries them to the vessel 26.

The loading assembly of the present invention allows to scrub the catalysts or other pelletized solid particles and remove dust from the loading conduits before they escape into the surrounding area or reach the processing vessels, converters, storage containers, and the like. A careful balance must be observed between the amount of pressure created in the vessel 12 and the dust removal conduit 22. Similarly, if the discharge nozzle 20 is selected for high-speed discharge, the dust particles may not have a chance to be directed into the flow moving towards the conduit 22.

In some tests it was determined that the sulfuric acid catalyst pellets, if discharged at a speed of greater than 20,000 liters per hour, created excessive dusting. However, if the nozzle is selected to discharge pelletized material at a speed of about or below 20,000 liters per hour, the results were consistently good every test cycle. The dust collection vessel 26 may have a capacity of moving 3,000 cubic feet per minute of the airflow. If the conduit 22 is about 3–4 inches in diameter, the capacity of the vessel 26 is sufficient to create the necessary vacuum in moving the dust through the conduit 22. Of course, the vacuum generated in the conduit 22 and the pressure values in the vessel 12 can be different for different types of solid particulate matter.

Many changes and modifications can be made in the apparatus of the present invention without departing from the spirit thereof. I therefore pray that my rights to the present invention be limited only by the scope of the appended claims.

I claim:

1. An assembly for delivering solid particulate matter for loading, comprising:

a pressurized vessel for retaining a pre-determined quantity of the solid particulate matter;

a discharge conduit for transferring the solid particulate matter from the pressurized vessel for loading, said discharge conduit carrying a discharge nozzle with a discharge opening on a distant end thereof, said discharge nozzle having a double-walled construction with an inner conduit and an outer sleeve with a plurality of air intake openings; and a means mounted upstream from said discharge opening for removing dust particles from said discharge nozzle, said dust removing means being in fluid communication with the outer sleeve of the discharge nozzle.

2. The assembly of claim 1, wherein said means for removing dust particles comprises a dust removal conduit mounted in fluid communication with said discharge nozzle and a dust collection container connected to said conduit for collecting the removed dust particles.

3. The assembly of claim 2, wherein said dust collection container is adapted for connection to a vacuum source for creating vacuum in said dust collection container and in said dust removal conduit to facilitate movement of the dust particles from said discharge nozzle to said dust collection container.

4. The assembly of claim 1, wherein said outer sleeve comprises an elongated hollow outer sleeve provided with a plurality of air intake openings along at least a portion thereof and an inner pipe extending through substantially entire length of said sleeve, said inner pipe being mounted in fluid communication with said discharge conduit.

5. The assembly of claim 4, wherein said inner pipe is provided with a plurality of mesh openings about substantially entire surface thereof, said mesh openings being sized to allow the dust particles to pass therethrough.

6. The assembly of claim 4, wherein an annular space is defined between an exterior of said inner pipe and an interior of said outer sleeve, and wherein the dust particles are allowed to move toward said means for removing the dust particles within said annular space.

7. The assembly of claim 1, wherein a flow regulating valve is mounted between said pressurized vessel and said discharge nozzle to regulate the flow of solid particulate matter through said discharge conduit.

8. The assembly of claim 1, wherein said discharge opening of said discharge nozzle is sized and shaped to correspond to an inlet opening of a loading vessel.

9. An assembly for delivering solid pelletized material for loading into a loading vessel, comprising:
   a pressurized vessel for retaining a pre-determined quantity of the pelletized material;
   a discharge conduit for transferring the pelletized material from the pressurized vessel to a loading vessel, said discharge conduit carrying a discharge nozzle with a discharge opening on a distant end thereof, said discharge nozzle having an outer sleeve with air intake openings formed through a wall of the outer sleeve and an inner conduit; and
   a means mounted upstream from said discharge opening for removing dust particles from said discharge nozzle, said means for removing dust particles comprising a dust removal conduit mounted in fluid communication with the outer sleeve of said discharge nozzle upstream of the air intake openings and a dust collection container connected to said dust removal conduit for collecting the removed dust particles.

10. The assembly of claim 9, wherein said discharge nozzle comprises a perforated hollow outer sleeve and an inner conduit provided with a plurality of mesh openings formed along substantially entire length of the inner conduit, said inner conduit extending through said sleeve and mounted in fluid communication with said discharge conduit for receiving the pelletized material and transferring the pelletized material into the loading vessel.

11. The assembly of claim 10, wherein an annular space is defined between an exterior of said inner conduit and an interior of said outer sleeve, and wherein the dust particles are allowed to move toward said dust collection container within said annular space.

12. The assembly of claim 9, wherein a pressure differential is created between said discharge conduit and said dust removal conduit to facilitate entrapment of dust particles and delivery of the dust particles into said dust collection container.

13. The assembly of claim 12, wherein said dust collection container is provided with an exhaust adapted for connection to a vacuum source.

14. The assembly of claim 9, wherein a flow regulating valve is mounted between said pressurized vessel and said discharge nozzle to regulate the flow of solid particulate matter through said discharge conduit.

15. A nozzle for discharging solid particulate matter, comprising:
   an elongated outer sleeve having a plurality of air intake openings formed along at least a portion of said sleeve;
   an inner conduit extending through said outer sleeve, said inner conduit being provided with a plurality of mesh openings and a discharge opening;
   a means for connecting said outer sleeve to a source of solid particulate matter; and
   a means for connecting said outer sleeve to a dust removal conduit.

16. The device of claim 15, wherein said means for connecting said sleeve to a dust removal conduit is located upstream from said air intake openings.

17. The device of claim 15, wherein an annular space is defined between an interior of said outer sleeve and an exterior of said inner conduit, and wherein said annular space is adapted for carrying dust particles toward said means for connecting said sleeve to a dust removal conduit.

18. An assembly for delivering solid sulfuric acid catalyst to a processing tank, comprising:
   a pressurized vessel for retaining a pre-determined quantity of the solid catalyst;
   a discharge conduit for transferring the solid catalyst from the pressurized vessel for loading, said discharge conduit carrying a discharge nozzle with a discharge opening on a distant end thereof, said discharge nozzle having a double-walled construction with an inner conduit and an outer sleeve; and
   a means mounted upstream from said discharge opening for removing dust particles from said discharge nozzle, said dust removing means being in fluid communication with the outer sleeve of the discharge nozzle.

19. The assembly of claim 18, wherein said outer sleeve is provided with a plurality of perforations formed upstream from said discharge opening, and wherein said inner conduit is provided with a plurality of mesh openings allowing fluid communication between an interior of the inner conduit and an annular space defined between the inner conduit and the outer sleeve to thereby remove dust particles generated by the solid catalyst before the dust articles escape through the discharge opening.

20. The assembly of claim 18, further comprising a dust collection container, and wherein a pressure differential is created between said discharge conduit and said dust removal means to facilitate entrapment of the dust particles and delivery of the dust particles into said dust collection container.

* * * * *